United States Patent
Panchal et al.

(10) Patent No.: US 12,464,448 B2
(45) Date of Patent: *Nov. 4, 2025

(54) METHOD AND SYSTEM FOR NETWORK SLICE AND FREQUENCY SELECTION

(71) Applicant: Verizon Patent and Licensing Inc., Basking Ridge, NJ (US)

(72) Inventors: Jignesh S. Panchal, Hillsborough, NJ (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,549

(22) Filed: Oct. 12, 2023

(65) Prior Publication Data

US 2024/0040498 A1 Feb. 1, 2024

Related U.S. Application Data

(63) Continuation of application No. 17/458,891, filed on Aug. 27, 2021, now Pat. No. 11,825,407.

(51) Int. Cl.
*H04W 48/18* (2009.01)
*H04W 4/029* (2018.01)
(Continued)

(52) U.S. Cl.
CPC .......... *H04W 48/18* (2013.01); *H04W 4/029* (2018.02); *H04W 24/02* (2013.01); *H04W 24/10* (2013.01); *H04W 64/003* (2013.01); *H04W 76/30* (2018.02)

(58) Field of Classification Search
CPC ... H04W 48/18; H04W 64/003; H04W 48/12; H04W 76/30; H04W 8/18;
(Continued)

(56) References Cited

U.S. PATENT DOCUMENTS 9,445,417 B2 9/2016 Hsu et al.
10,595,251 B2 * 3/2020 Wong ................ H04W 36/0055
(Continued)

FOREIGN PATENT DOCUMENTS

CN 111801909 A * 10/2020 ............ H04W 72/29
CN 113079537 7/2021
(Continued)

OTHER PUBLICATIONS

M. Tayyab, X. Gelabert and R. Jäntti, "A Survey on Handover Management: From LTE to NR," in IEEE Access, vol. 7, pp. 118907-118930, 2019, doi: 10.1109/ACCESS.2019.2937405 (Year: 2019).*

(Continued)

*Primary Examiner* — William D Cumming

(57) ABSTRACT

A method, a device, and a non-transitory storage medium are described in which a frequency and network slice selection service is provided. The service may configure network slices at a cell level which may include carrier frequencies or bands that may be ranked in terms of preference for a network slice. The service may provide frequency/band-network slice information to end devices via system information block and radio resource control messages. End devices may perform a cell search procedure and use other criteria to select and establish a network slice connection via a frequency/band of a network slice and in accordance with the service.

20 Claims, 11 Drawing Sheets

(51) Int. Cl.
*H04W 24/02* (2009.01)
*H04W 24/10* (2009.01)
*H04W 64/00* (2009.01)
*H04W 76/30* (2018.01)

(58) Field of Classification Search
CPC ......... H04W 36/0055; H04W 36/0835; H04W 48/20; H04W 28/16; H04W 24/10
USPC ................................... 370/329, 331; 455/436
See application file for complete search history.

(56) References Cited

U.S. PATENT DOCUMENTS

| | | | | |
|---|---|---|---|---|
| 10,893,448 | B2* | 1/2021 | Panchal | H04W 48/20 |
| 11,659,444 | B1 | 5/2023 | Xing | |
| 11,659,463 | B2* | 5/2023 | Wong | H04W 76/30 |
| | | | | 455/436 |
| 11,765,633 | B2* | 9/2023 | Panchal | H04W 36/00835 |
| | | | | 370/331 |
| 11,825,407 | B2* | 11/2023 | Panchal | H04W 48/12 |
| 2015/0289266 | A1 | 10/2015 | Hsu et al. | |
| 2019/0223069 | A1* | 7/2019 | Wong | H04W 8/18 |
| 2019/0373523 | A1* | 12/2019 | Panchal | H04L 5/0032 |
| 2020/0187074 | A1* | 6/2020 | Wong | H04W 36/0055 |
| 2021/0037426 | A1 | 2/2021 | Zhu et al. | |
| 2021/0099934 | A1* | 4/2021 | Panchal | H04L 5/0032 |
| 2021/0282082 | A1 | 9/2021 | Mildh et al. | |
| 2021/0337448 | A1* | 10/2021 | Youtz | H04W 48/12 |
| 2022/0369215 | A1 | 11/2022 | Dees et al. | |
| 2022/0408293 | A1* | 12/2022 | Han | H04W 24/10 |
| 2023/0056855 | A1 | 2/2023 | Jiang | |
| 2023/0062190 | A1* | 3/2023 | Panchal | H04W 64/003 |
| 2023/0077133 | A1 | 3/2023 | Tang | |
| 2023/0079792 | A1* | 3/2023 | Zhu | H04W 76/30 |
| | | | | 370/329 |
| 2023/0094999 | A1 | 3/2023 | Prakasam et al. | |
| 2024/0040498 | A1* | 2/2024 | Panchal | H04W 48/18 |

FOREIGN PATENT DOCUMENTS

| | | | | |
|---|---|---|---|---|
| CN | 113676927 A | * | 11/2021 | ............ H04W 24/02 |
| EP | 3570588 A1 | * | 11/2019 | ............ H04W 76/16 |
| EP | 4096292 | | 11/2022 | |
| EP | 4142376 | | 3/2023 | |
| WO | WO-2019219671 A1 | * | 11/2019 | ............ H04W 60/04 |
| WO | WO-2021091266 A1 | * | 5/2021 | ............ H04W 24/10 |
| WO | WO-2021227599 A1 | * | 11/2021 | ............ H04W 24/02 |
| WO | 2022/059768 | | 3/2022 | |

OTHER PUBLICATIONS

English translation of WO 2021227599A1 (Year: 2024).*
"English translation of CN 113079537 Apr. 2023 (Year: 2023)".
Manjeshwar, et al., "Enhanced UE Slice Mobility for 5G Multi-RAT Networks", 2019 IEEE Conference on Network Function Virtualization and Software Defined Networks (NFV-SDN), Dallas, TX, USA, 2019, pp. 1-6, doi:10.1109/N FV-SDN4737 4.2019.9039982. (Year: 2019).

* cited by examiner

METHOD AND SYSTEM FOR NETWORK SLICE AND FREQUENCY SELECTION

CROSS REFERENCE TO RELATED APPLICATION

This patent application is a continuation of U.S. patent application Ser. No. 17/458,891 entitled "METHOD AND SYSTEM FOR NETWORK SLICE AND FREQUENCY SELECTION" and filed on Aug. 27, 2021, the disclosure of which is incorporated by reference herein in its entirety.

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
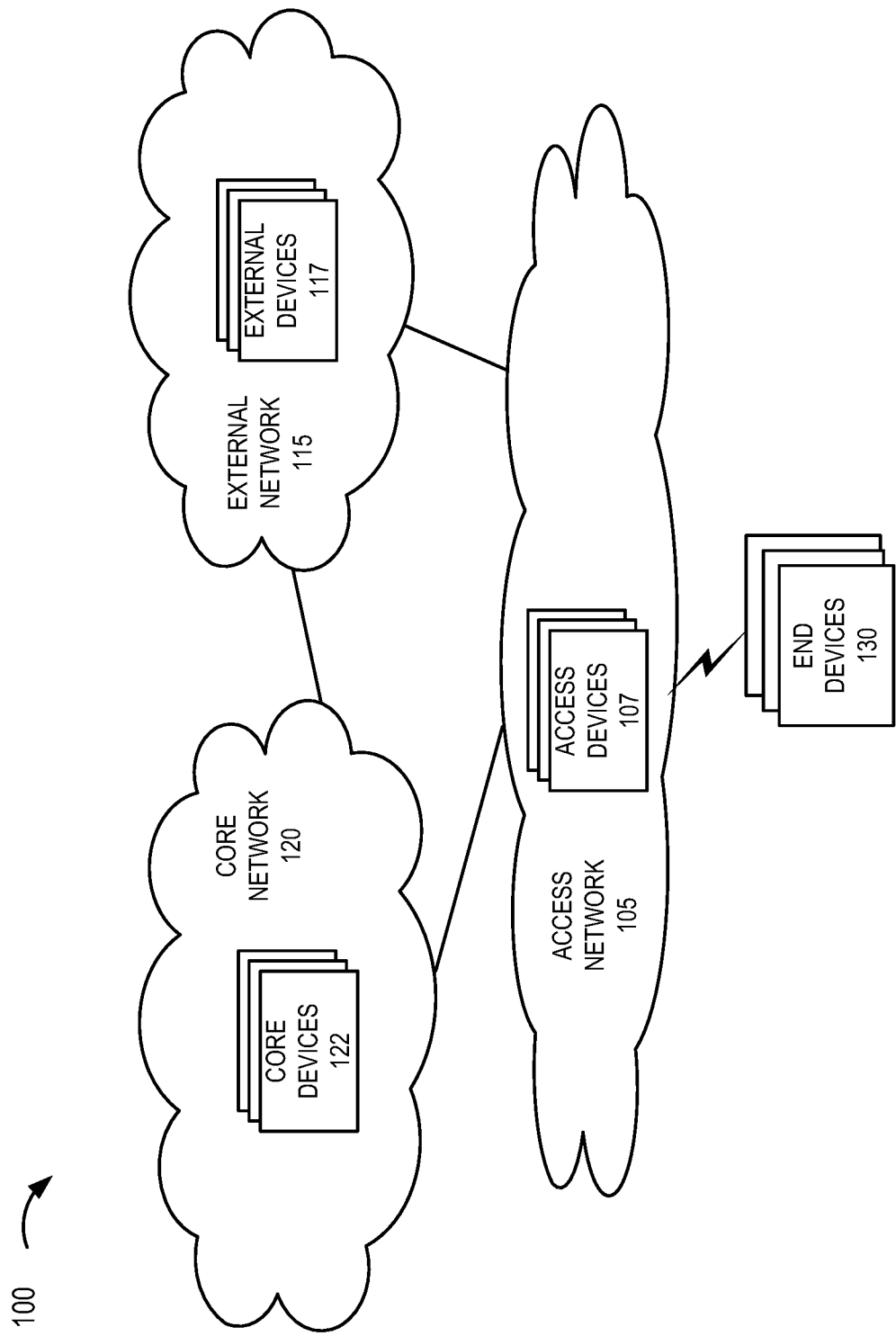
FIG. 1 is a diagram illustrating an exemplary environment in which an exemplary embodiment of a frequency and network slice selection service may be implemented.

The following detailed description refers to the accompanying drawings. The same reference numbers in different drawings may identify the same or similar elements. Also, the following detailed description does not limit the invention.

End devices may access and use various applications, services, and/or assets (referred to as application services) via network slices. A list of available network slices may be tied to a tracking area (TA) or a registration area (RA), for example. Also, cells or frequency bands within a TA, for example, may support all network slices, such as allowed network slice selection assistance information (NSSAIs) for a given public land mobile network (PLMN). However, there is no direct nexus between network slice availability and a cell, a sector, a sub-sector, a carrier frequency, and/or a frequency band (referred to as a frequency/band). Further, the attribute of the frequency/band has an impact on performance metrics pertaining to application services. For example, millimeter wave (mm wave), C-band, and centimeter wave (cm wave) have different capabilities in relation to service level agreements (SLAs) and associated performance metrics (e.g., throughput, latency, jitter, reliability, throughput, and/or another type of metrics). As an example, mm wave may support higher uplink (UL) and downlink (DL) throughput and lower latency relative to a lower frequency band, but mm wave may not support long ranges. In contrast, cm wave may support better coverage compared to mm wave, but cm wave may have lower throughput and higher latency.

According to exemplary embodiments, a frequency and network slice selection service is described. According to an exemplary embodiment, the frequency and network slice selection service includes an idle mode slice selection service. According to an exemplary embodiment, the idle mode slice selection service may include communicating to end devices preferred frequency/band information for a network slice, as described herein. Based on the communication, end devices may perform an idle mode cell selection procedure in accordance with the preferred frequency/band and network slice information.

According to an exemplary embodiment, the frequency and network slice selection service includes a connected mode slice selection service. According to an exemplary embodiment, the connected mode slice selection service may include rejecting an end device request for a network slice when the request is not made in accordance with preferred frequency/band information, as described herein. According to an exemplary embodiment, the connected mode slice selection service may include redirecting an end device to a preferred frequency/band for requesting a network slice, as described herein. According to an exemplary embodiment, the connected mode slice selection service may manage handover and associated source-to-target frequency/band due to mobility of the end device, as described herein.

In view of the foregoing, the frequency and network slice selection service may support in a network the provisioning and management of network slices and frequency/band pairings. For example, the frequency and network slice selection service may provide flexibility for deploying network slices at a cell level. Additionally, network slices may be customized to a frequency/band based on the attributes associated with the frequency/band. The frequency and network slice selection service may improve the performance of application services used by end devices.

FIG. 1 is a diagram illustrating an exemplary environment 100 in which an exemplary embodiment of frequency and network slice selection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the frequency and network slice selection service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System Mobile Association (GSMA), and the like) or a new interface of the network device may be provided in order to support the communication (e.g., transmission and reception of messages, information elements (IE), attribute value pairs (AVPs), objects, parameters, or another form of a data instance) between network devices and the frequency and network slice selection service logic of a network device and/or an end device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

According to some exemplary embodiments, access network 105 may be implemented to include various architectures of wireless service, such as, for example, 5G, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, carrier frequencies, and segments of radio spectrum (e.g., cm wave, mm wave, below 6 gigahertz (GHz), above 6 GHz, higher than mm wave, C-band, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application service.

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. End device 130 is not to be considered a network device, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, at least a portion of access devices 107 may include frequency and network slice selection service logic and an interface that supports the frequency and network slice selection service, as described herein. According to some exemplary embodiments, other network devices of other types of networks (e.g., core network 120, external network 115, an X-haul network, or another type of network) may include frequency and network slice selection service logic and an interface that supports the frequency and network slice selection service, as described herein.

Figure 2A:
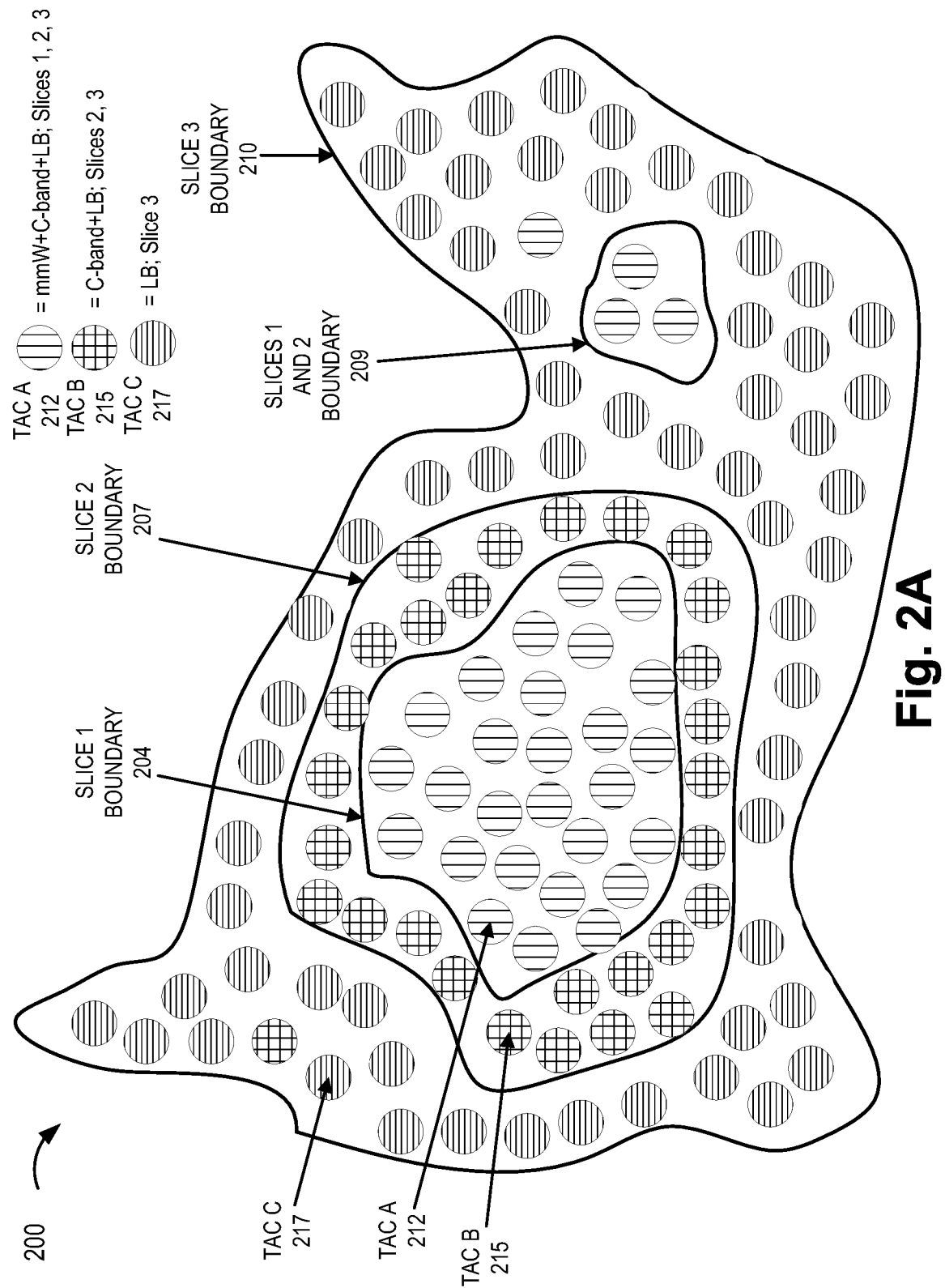
FIG. 2A is a diagram illustrating another exemplary environment in which exemplary embodiments of the frequency and network slice selection service may be implemented.

FIG. 2A is a diagram illustrating another exemplary environment 200 in which an exemplary embodiment of frequency and network slice selection service may be implemented. As illustrated, environment 200 may include exemplary network slice boundaries, such as a network slice 1 boundary 204, a network slice 2 boundary 207, a network slices 1 and 2 boundary 209, and a network slice 3 boundary 210. As further illustrated, a geographic area defined by the slice boundaries may include tracking area codes (TACs), such as a TAC A 212 (illustrated as a circle filled with vertical lines), a TAC B 215 (illustrated as a circle filled with checkered lines), and a TAC C 217 (illustrated as a circle filled with horizontal lines). For example, a TAC may uniquely identify a TA. According to other exemplary embodiments, environment 200 may include RAs. For example, a RA may include one or multiple TAs (e.g., a TA list). According to such exemplary embodiments, environment may include routing area codes (RACs). A RAC may uniquely identifier a RA. The number, type, and arrangement of network slice boundaries and TACs are exemplary. As further illustrated in FIG. 2A, TAC A 212, TAC B 215, and TAC C 217 may represent cell sites deployed with certain frequencies/frequency bands and network slices. For example, TAC A 212 may indicate one or multiple cell sites or access devices 107 that use mm wave, C-band, and low band (LB) and supports network slices 1, 2, and 3. Additionally, for example, TAC B 215 may indicate one or multiple cell sites or access devices 107 that use C-band and LB and supports network slices 1 and 2, and TAC C 217 may indicate one or multiple cell sites or access devices 107 that uses only LB and supports network slice 3.

According to an exemplary embodiment, a TAC may support certain network slices and be associated with a frequency/band configuration according to the frequency and network slice selection service, as described herein. For example, referring to a table 230 illustrated in FIG. 2B, a field 235 may indicate a TAC, a field 240 may indicate network slice information, a field 245 may indicate frequency information, a field 250 may indicate non-access stratum (NAS) signaling to UE, and a field 255 may indicate registration information. Further to this example, assume end device 130 may be subscribed to network slices 1, 2, 3, and 12, but the AMF (not illustrated) may only support network slices 1, 2, and 3. In this regard, referring to FIGS. 2A and 2B, TAC A 212 may support network slices 1, 2, and 3, have options for a frequency/band configuration, such as C-band and mm wave using DC or low band and mm wave using DC, NAS configuration (e.g., from an AMF) to end device 130 that indicates allowed NSSAI (A_NSSAI) for network slices 1, 2, and 3, rejected NSSAI (R_NSSAI) for network slice 12, and a TA list that includes TAC A, and an initial mobile registration update (MRU). Additionally, according to this example, different configurations for TAC B 215 and TAC C 217 and correlated configurations pertaining to network slice information, frequency information, NAS to UE, and registration are illustrated in table 230.

According to other exemplary embodiments, table 230 may include additional, different, and/or fewer fields. For example, table 230 may include a field that indicates a RAC.

Figure 2B:
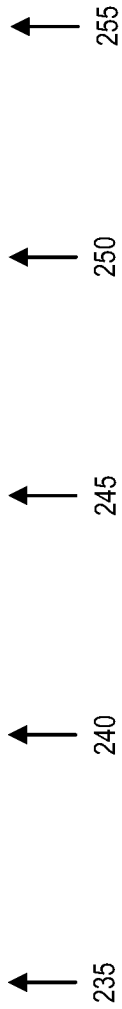
FIG. 2B is a diagram illustrating an exemplary embodiment of frequency and network slice information.

Referring to FIGS. 2A and 2B, for a network slice 1, frequency/band information may indicate that mm wave is a necessary frequency band, for example. Additionally, for example, for network slice 2, frequency/band information may indicate that mm wave or C-band may be used, and for network slice 3, frequency/band information may indicate that any band may be used (e.g., mm wave, C-band, or low band (LB)).

Figure 3:
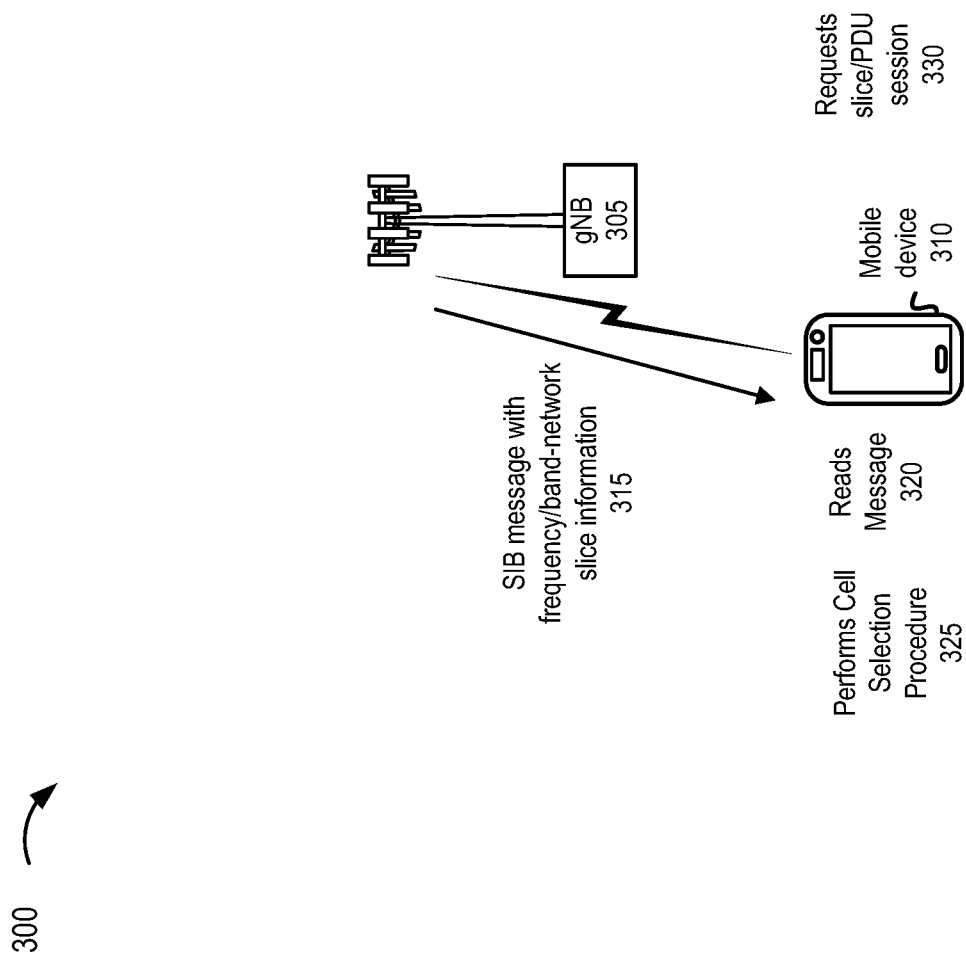
FIG. 3 is a diagram illustrating an exemplary process of an exemplary embodiment of the frequency and network slice selection service.

FIG. 3 is a diagram illustrating an exemplary environment 300 in which an exemplary process of an exemplary embodiment of frequency and network slice selection service may be implemented. As illustrated, environment 300 may include a gNB 305 (e.g., access device 107) and a mobile device 310 (e.g., end device 130). According to other exemplary embodiments, environment 300 may include additional and/or different network devices and/or end devices than those depicted and described in relation to FIG. 3.

According to an exemplary embodiment, gNB 305 may transmit a system information base (SIB) message 315 that includes frequency/band-network slice information. For example, SIB message 315 may include a SIB 1, a SIB 3, a SIB 4, another type of SIB message (e.g., SIB 2, etc.) associated with a standard (e.g., 3GPP, 3GPP2, etc.) and also include frequency/band-network slice information, as described herein. Alternatively, SIB message 315 may include a new SIB message relative to the standard and also includes frequency/band-network slice information. According to some exemplary scenarios, gNB 305 may transmit SIB message 315 when mobile device 310 may be in a radio resource control (RRC) idle state and in a disconnected mode (e.g., de-registered, not attached). According to another exemplary scenario, gNB 305 may transmit SIB message 315 when mobile device 310 may be in an RRC connected inactive state. According to an exemplary embodiment, the frequency/band-network slice information may pertain to gNB 305 or gNB 305 and a neighboring access device 107, for example.

According to an exemplary embodiment, the frequency/band-network slice information may indicate a ranking of frequency/band information relative to a network slice. According to some exemplary embodiments, the frequency/band-network slice information may include a default frequency/band-network slice pairing.

Figure 4:
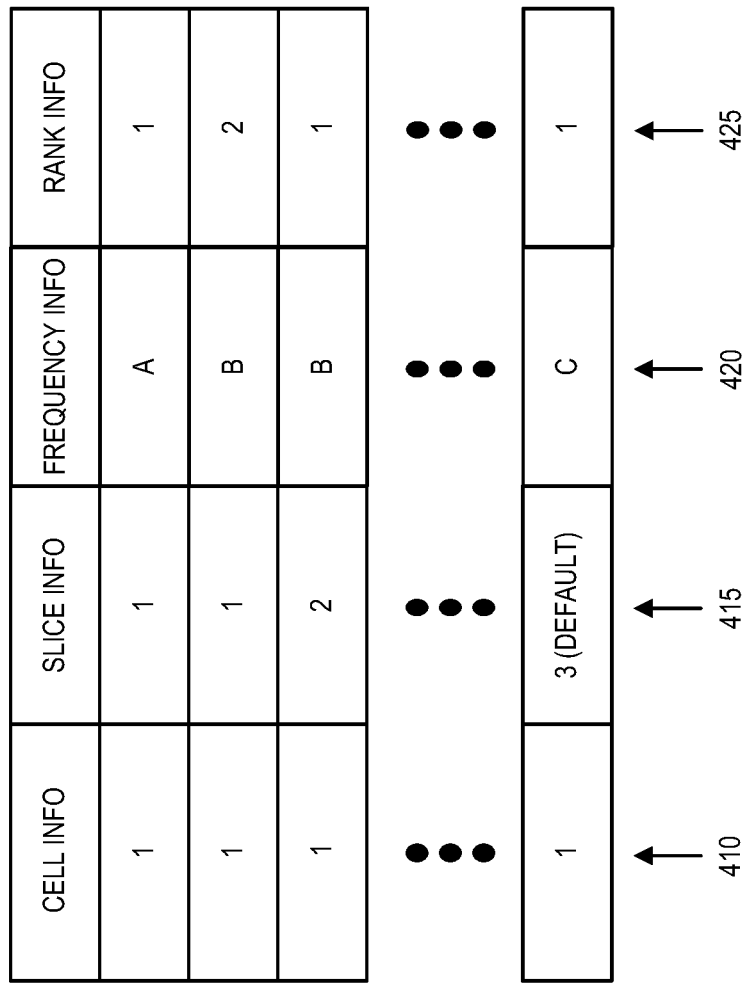
FIG. 4 is a diagram illustrating another exemplary embodiment of frequency and network slice information.

FIG. 4 is a diagram illustrating exemplary frequency/band-network slice information 400. Frequency/band-network slice information 400 may be included in SIB message 315 in various forms (e.g., an IE, an AVP, an object, a parameter and a parameter value, payload information, or another form of a data instance). For purposes of description, frequency/band-network slice information 400 is depicted in tabular form. As illustrated, frequency/band-network slice information 400 may include cell information 410, slice information 415, frequency information 420, and rank information 425, which may be correlated (e.g., in row fashion) as a group or set of instances of frequency/band-network slice information. The values illustrated are exemplary.

Cell information 410 may include an identifier of a cell, a sector, or a sub-sector. For example, cell information 410 may include a physical cell identifier (PCI) or a globally unique PCI that identifies a cell of gNB 305 or a cell of a neighboring access device 107.

Slice information 415 may include an identifier that identifies a network slice. For example, slice information 415 may include network slice selection assistance information (NSSAI), single-NSSAI, or a portion thereof, such as slice service type (SST) information.

Frequency information 420 may include a carrier frequency, a frequency band, a subset of a frequency band, or a name. For example, frequency information 420 may indicate a band (e.g., n261), a carrier frequency (e.g., 28 GHz), a name (e.g., Ka-band), a subset of the band (e.g., n257), and/or include another frequency/band-related data instance. Frequency information 420 may also include a connectivity service (e.g., DC, CA, etc.), as described herein.

Rank information 425 may include a rank or preference value relating to the frequency information, which may be correlated to slice and cell information.

According to other exemplary implementations, frequency/band-network slice information 400 may include additional, fewer, and/or different instances of frequency/band-network slice information in support of the frequency and network slice selection service, as described herein.

Referring back to FIG. 3, SIB message 315 may be implemented to include a SIB message of a standard (e.g., 3GPP, 3GPP2, etc.) or not (e.g., a new SIB) and may also include frequency/band-network slice information, as described herein. As such, an (air) interface of a network device (e.g., access device 107, gNB 305, etc.) and an (air) interface of an end device (e.g., end device 130, mobile device 310, etc.) may operate according to some or all of the configurations and/or functionality defined by the standard (e.g., 3GPP, 3GPP2, etc.) and additionally operate/support an exemplary embodiment of the frequency and network slice selection service.

In response to receiving SIB message 315, mobile device 310 may read the message 320. Based on the reading and interpretation of SIB message 315, mobile device 310 may perform a cell selection procedure 325. For example, mobile device 310 may select a network slice, based on the frequency/band-network slice information included in SIB message 315, and select a frequency/band (e.g., starting with a highest ranked frequency/band) for searching and measuring. In this way, the cell selection procedure may be optimized based on the frequency/band-network slice information. Mobile device 310 may select the highest ranked or preferred frequency/band relating to the selected network slice. In the event that equally ranked multiple frequencies/bands are discovered during the cell selection procedure, mobile device 310 may select the most suitable frequency/band based on additional criterion. For example, mobile device 310 may select the frequency/band that provides the highest signal strength. If a frequency/band of a given ranking is not found, mobile device 310 may select the next preferred or ranked frequency band to search and measure as a part of the cell selection procedure.

In the case that mobile device 310 is unable to find a suitable frequency/band for the selected network slice, mobile device 310 may select a next preferred or prioritized network slice and repeat the cell selection procedure, as described herein. If the cell selection procedure based on the frequency/band-network slice information, as described herein, fails for some reason, mobile device 310 may perform a cell selection procedure based on other criteria, such as signal strength, for example. Also, if a preferred and/or ranked frequency-band/network slice information is not available, mobile device 310 may perform a legacy cell selection procedure according to one or multiple criteria.

According to some exemplary embodiments, an operator, a network service provider, or another entity may configure a default network slice that may be used by end device 130 for a cell search and selection procedure when in idle mode camping or inactive mode camping, for example. As an example, when ranked or preferred frequency/band-network slice information is not available, access device 107 may communicate with higher level network layers and adjusts it optimization for cell selection procedure and corresponding frequency/band-network slice information to be provided to end device 130. For example, access device 107 may transmit a message that indicates a default frequency/band and corresponding network slice. Alternatively, for example, when ranking information is not available but frequency/band and network slice pairing information is available, access device 107 may indicate in a message (e.g., SIB, etc.) or end device 130 may be configured to use another criterion or criteria for cell selection, such as highest signal strength, highest frequency/band, and/or another criterion. Additionally, or alternatively, access device 107 may indicate in a message or end device 130 may be configured to select a frequency/band that supports the highest number of network slices, for example. When multiple frequency/bands support an equal number of network slices, end device 130 may use additional criteria, such as signal strength, highest frequency/band, and so forth, to make the selection. As further illustrated in FIG. 3, after a frequency/band and network slice is selected and connection is made, mobile device 310 may request a slice/protocol data unit (PDU) session 330. For example, mobile device 310 may request to establish an application service session via the network slice, which is supported by the frequency/band.

Figure 5:
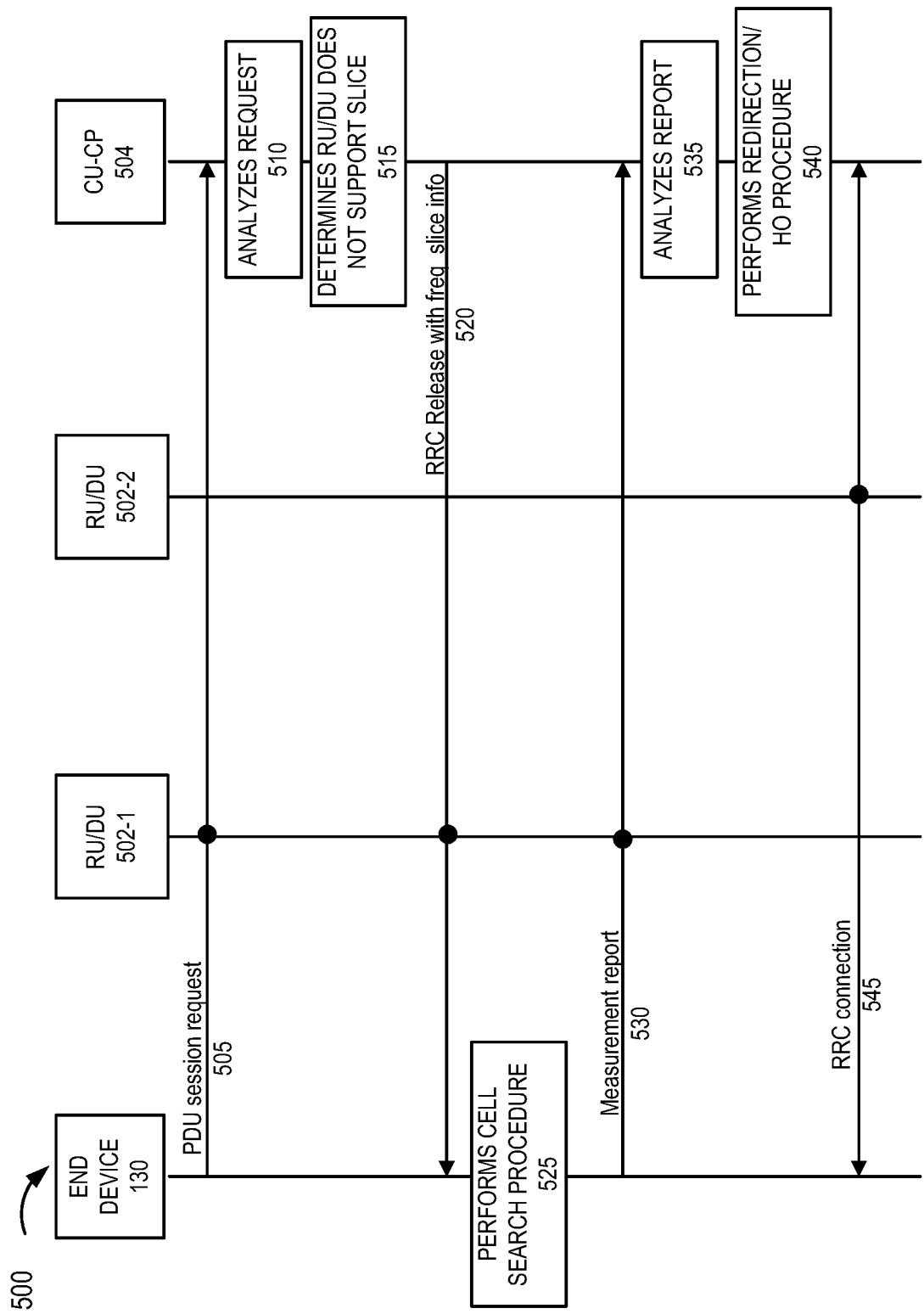
FIG. 5 is a diagram illustrating another exemplary process of an exemplary embodiment of the frequency and network slice selection service.

FIG. 5 is a diagram illustrating an exemplary environment in which an exemplary process 500 of an exemplary embodiment of frequency and network slice selection service may be implemented. According to an embodiment of process 500, an RRC message may include frequency/band-network slice information. According to an exemplary scenario, end device 130 may be in an RRC connected state. For example, end device 130 may be attached and registered with access network 105 and core network 120. According to this example, access device 107 may be implemented in a split architecture, which may include an RU/DU 502-1, an RU/DU 502-2, and CU-CP 504. According to other exemplary scenarios, process 500 may be implemented in a different type of split architecture or in a non-split architecture.

Referring to FIG. 5, end device 130 may generate and transmit a PDU session request 505 that requests an application service via a network slice. PDU session request 505 may include network slice information (e.g., NSSAI, S-NSSAI, etc.) and data network name (DNN). PDU session request 505 may include other types of information (e.g., PDU session ID, request type, etc.). CU-CP 504 may receive the request and analyze the request 510. For example, CU-CP 504 may store frequency/band-network slice information, such as information described in table 230 or frequency/band-network slice information 400. Based on the requested network slice by end device 130 and the frequency/band-network slice information, CU-CP 504 may compare and determine 515 that RU/DU 502-1 does not support or does not provide a preferred carrier frequency/frequency band that supports the requested network slice. Based on this determination, CU-CP 504 may generate and transmit an RRC connection release message 520 that includes frequency/band-network slice information of relevance to the PDU session request (e.g., including the requested network slice). CU-CP 504 may consider other types of information, such as an RA or a TA of end device 130, for example.

As illustrated, in response to receiving the RRC connection release message, end device 130 may perform a cell search procedure 525. For example, end device 130 may perform a cell search, measure pilot signals, and generate and transmit a measurement report 530 to CU-CP 504. In response to receiving the measurement report, CU-CP 504 may analyze the measurement report 535 and perform a redirection or handover procedure 540 based on a selected frequency/band that supports the requested network slice. According to an exemplary implementation, although not illustrated, CU-CP 504 may transmit an RRC connection reconfiguration message that indicates a neighboring radio node. According to this exemplary scenario, end device 130 may establish an RRC connection 545 with RU/DU 502-2. Process 500 may be performed in various contexts, such as DC, CA, handover, or mobility contexts, for example.

According to other exemplary embodiments and exemplary scenarios, process 500 may include additional, fewer, and/or different device operation and/or messaging. For example, for a network slice that may be supported by DC or CA, end device 130 may not release an RRC connection with RU/DU 502-1. The instruction to end device 130 not to release a current RRC connection but to add another RRC connection via a preferred frequency/band may be indicated (e.g., by a flag, a value, a parameter/parameter value, etc.) in the frequency/band-network slice information of an RRC Release message or an RRC connection reconfiguration message, for example. Additionally, or alternatively, the instruction to end device 130 to not release a current RRC connection may relate to a mobility or a handover of end device 130.

Figure 6:
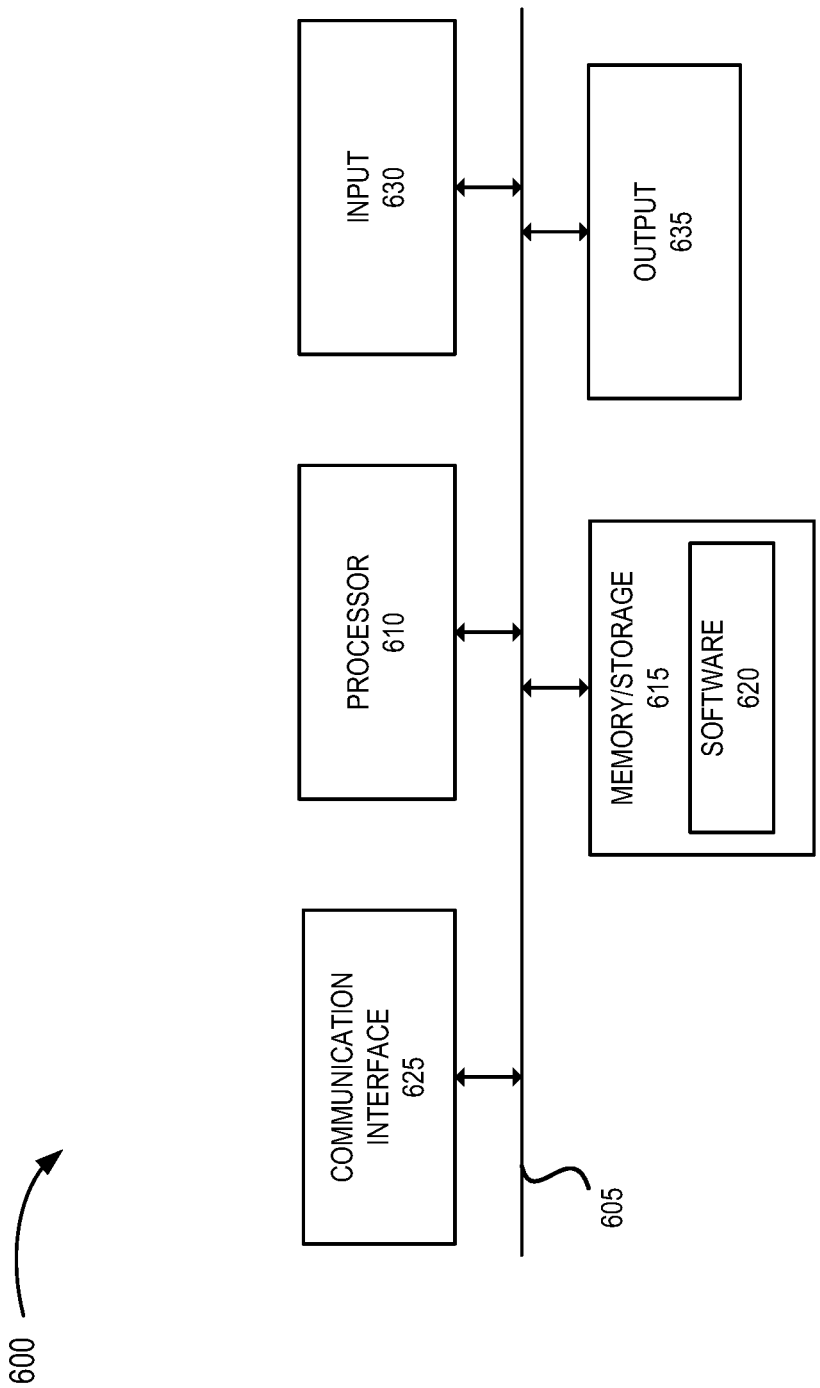
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to access device 107, external device 117, core device 122, end device 130, gNB 305, mobile device 310, RU/DU 502, CU-CP 504, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to access device 107, software 620 may include an application that, when executed by processor 610, provides a function and/or a process of frequency and network slice selection service, as described herein. Additionally, with reference to end device 130, software 620 may include an application that, when executed by processor 610, provides a function and/or a process of frequency and network slice selection service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example. As previously mentioned, communication interface 625 may support the frequency and network slice selection service, as described herein.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies. For example, access device 107, gNB 305, core device 122, external device 117, and/or another type of network device or end device 130, as described herein, may be a virtualized device.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
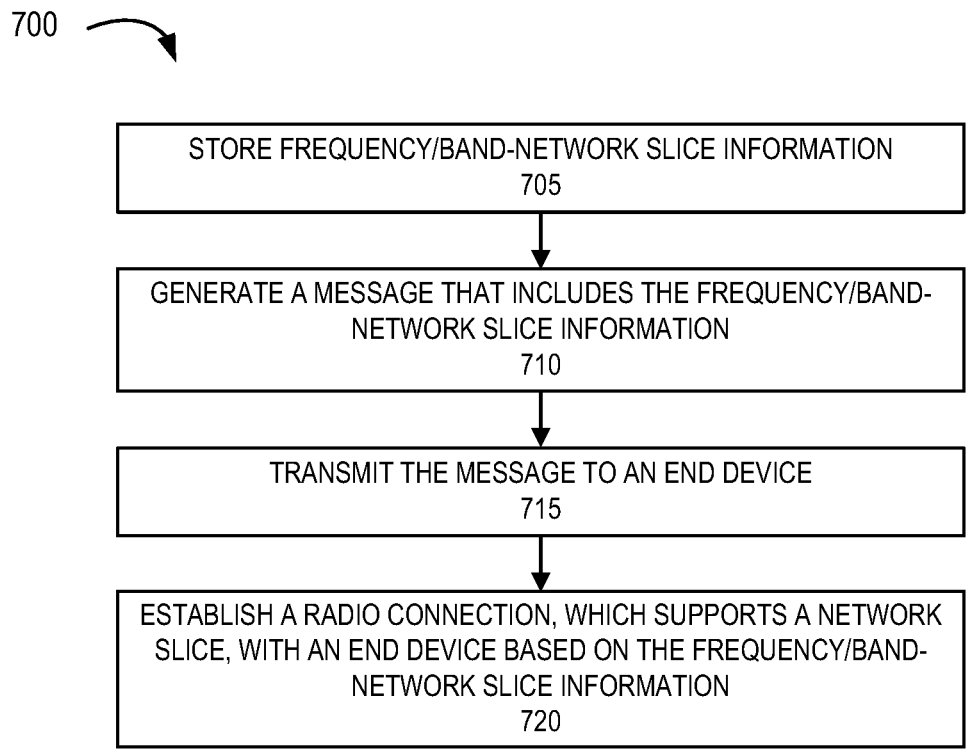
FIG. 7 is a flow diagram illustrating an exemplary process of an exemplary embodiment of a frequency and network slice selection service.

FIG. 7 is a flow diagram illustrating an exemplary process 700 of an exemplary embodiment of frequency and network slice selection service. According to an exemplary embodiment, access device 107 may perform a step of process 700. According to an exemplary implementation, processor 610 executes software 620 to perform the step of process 700, as described herein. Alternatively, the step may be performed by execution of only hardware. Additionally, as described herein, an interface of access device 107 (e.g., modified, new) may support a communication of information for the frequency and network slice selection service.

In block 705, access device 107 may store frequency/band-network slice information. For example, the frequency/band-network slice information may include frequency/band to network slice mappings. The frequency/bands may be ranked. The frequency/band-network slice information may include additional information, as described herein.

In block 710, access device 107 may generate a message that includes the frequency/band-network slice information. For example, access device 107 may generate a SIB message that includes the frequency/band-network slice information. According to another example, access device 107 may transmit a non-access stratum (NAS) message that includes the frequency/band-network slice information. The NAS message may be dedicated signaling for a particular end device 130.

In block 715, access device 107 may transmit the message. For example, access device 107 may broadcast the SIB message.

In block 720, access device 107 may establish a radio connection, which supports a network slice, with an end device based on the frequency/band-network slice information. For example, access device 107 may perform an RRC procedure with end device 130.

FIG. 7 illustrates an exemplary embodiment of a process of frequency and network slice selection service, according to other exemplary embodiments, the frequency and network slice selection service may perform additional operations, fewer operations, and/or different operations than those illustrated and described.

Figure 8:
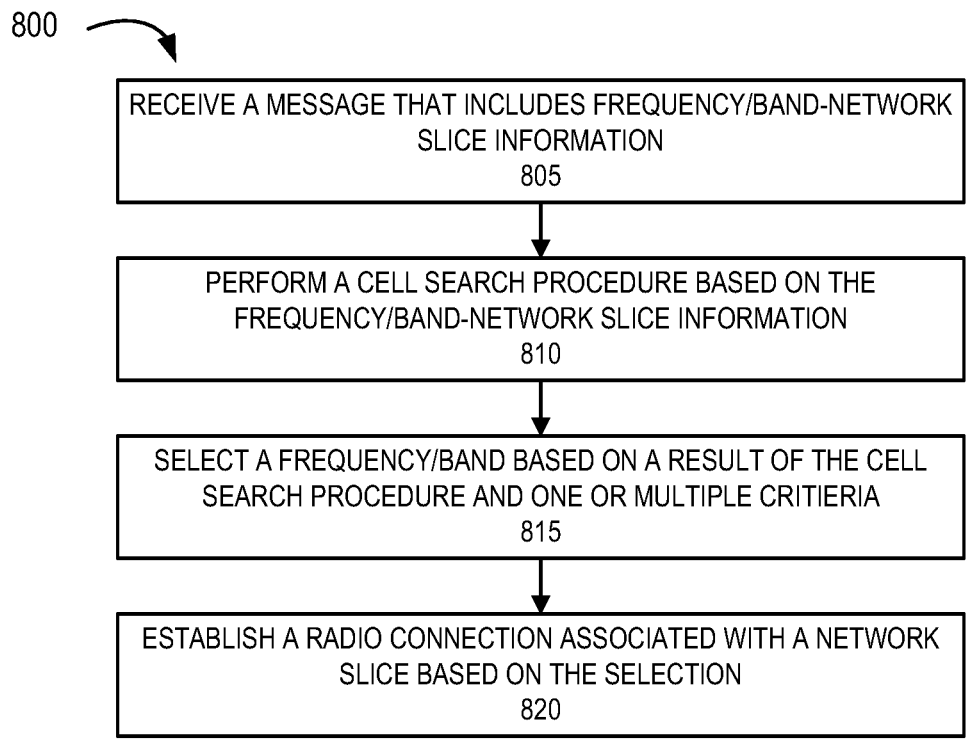
FIG. 8 is a flow diagram illustrating another exemplary process of an exemplary embodiment of a frequency and network slice selection service.

FIG. 8 is a flow diagram illustrating an exemplary process 800 of an exemplary embodiment of frequency and network slice selection service. According to an exemplary embodiment, end device 130 may perform a step of process 800. According to an exemplary implementation, processor 610 executes software 620 to perform the step of process 800, as described herein. Alternatively, the step may be performed by execution of only hardware. Additionally, as described herein, an interface of end device 130 (e.g., modified, new) may support a communication of information for the frequency and network slice selection service.

In block 805, end device 130 may receive a message that includes frequency/band-network slice information. For example, the message may be a SIB message. End device 130 may be in deregistered state or an RRC inactive state, for example. According to another example, end device may receive a NAS message that includes the frequency/band-network slice information. The NAS message may be dedicated signaling for a particular end device 130.

In block 810, end device 130 may perform a cell search procedure based on the frequency/band-network slice information. For example, end device 130 may search and measure signals based on the frequency/band-network slice information.

In block 815, end device 130 may select a frequency/band based on a result of the cell search procedure. For example, end device 130 may select a highest ranked or preferred frequency/band based on a result of the cell search procedure. End device 130 may apply other criteria in selecting the frequency/band, such as signal strength, highest frequency/band, frequency/band that supports the highest number of network slices, and/or another criterion.

In block 820, end device 130 may establish a radio connection associated with a network slice based on the selection. For example, end device 130 may perform an RRC procedure relative to access device 107.

FIG. 8 illustrates an exemplary embodiment of a process of frequency and network slice selection service, according to other exemplary embodiments, the frequency and network slice selection service may perform additional operations, fewer operations, and/or different operations than those illustrated and described.

Figure 9:
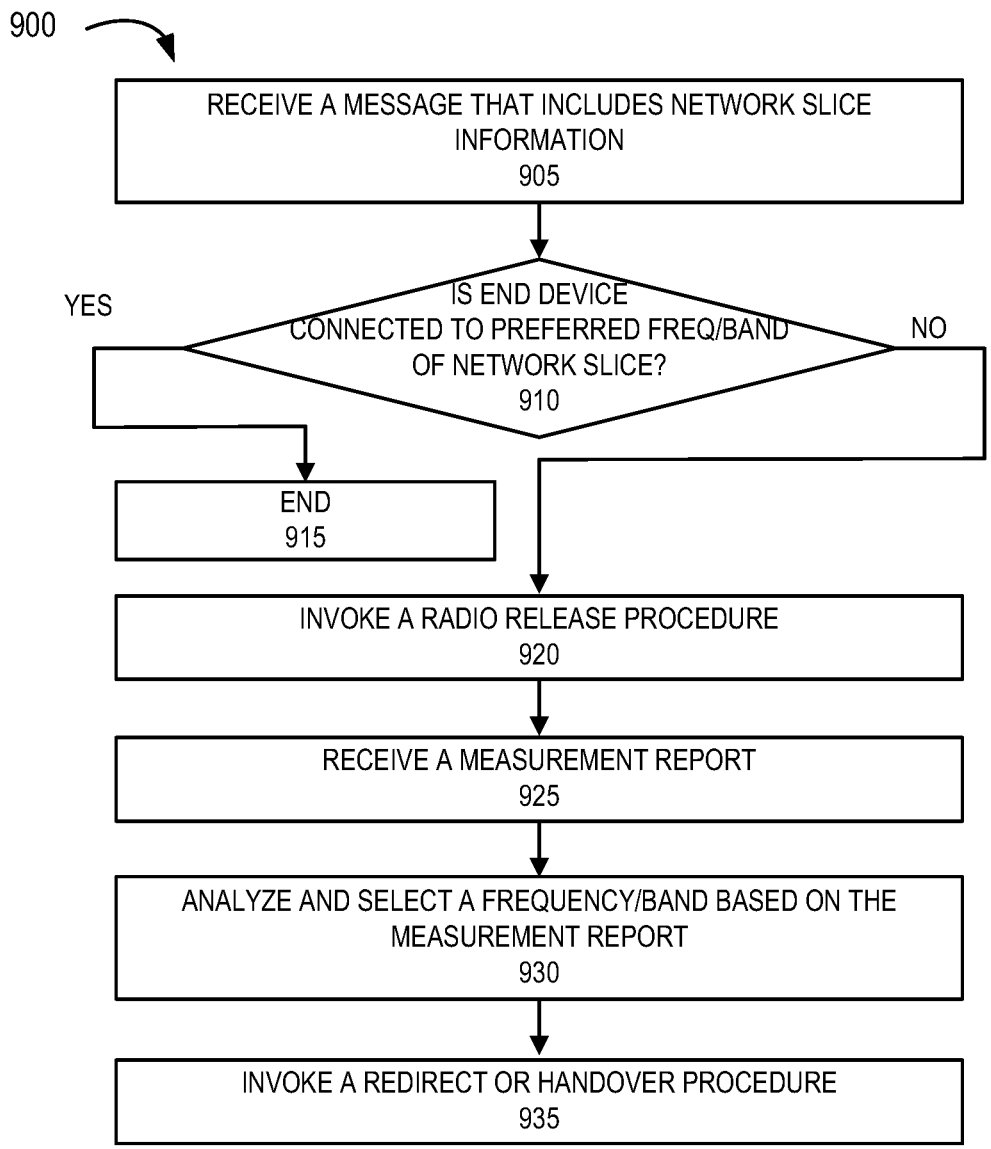
FIG. 9 is a flow diagram illustrating still another exemplary process of an exemplary embodiment of a frequency and network slice selection service.

FIG. 9 is a flow diagram illustrating an exemplary process 900 of an exemplary embodiment of frequency and network slice selection service. According to an exemplary embodiment, access device 107 may perform a step of process 900. According to an exemplary implementation, processor 610 executes software 620 to perform the step of process 900, as described herein. Alternatively, the step may be performed by execution of only hardware. Additionally, as described herein, an interface of access device 107 (e.g., modified, new) may support a communication of information for the frequency and network slice selection service.

In block 905, access device 107 may receive a message that includes network slice information. For example, access device 107 may receive a PDU session request, which may include S-NSSAI or NSSAI from end device 130.

In block 910, access device 107 may determine whether end device 130 is connected to a preferred frequency/band of a network slice. For example, access device 107 may analyze the PDU session request, other information included in the PDU session request (e.g., DNN, etc.), and context information (e.g., TA, RA, frequency/band of current radio connection, current bearer information, UE capability information, etc.) that may pertain to end device 130, which may be stored by access device 107. Access device 107 may also store frequency/band-network slice information and may compare this information. Based on a result of the comparison, access device 107 may determine whether end device 130 is radio-connected in a manner that supports the requested PDU session and network slice in accordance with the frequency and network slice selection service.

When access device 107 determines that end device 130 is connected to a preferred frequency/band of the requested network slice (block 910—YES), process 900 may end (block 915). For example, access device 107 may perform a PDU session request procedure that processes the PDU session request in a normal manner.

When access device 107 determines that end device 130 is not connected to a preferred frequency/band of the requested network slice (block 910-NO), access device 107 may execute a radio release procedure (block 920). For example, access device 107 may generate an RRC release message, which may include frequency/band-network slice information of relevance to the requested network slice. Access device 107 may transmit the RRC release to end device 130.

In block 925, access device 107 may receive a measurement report from end device 130. For example, end device 130 may execute a cell search procedure in response to receiving the RRC release, as described herein.

In block 930, access device 107 may analyze the measurement report and select a frequency/band conducive to the requested network slice based on the results of the measurement report.

In block 935, access device 107 may invoke a redirection procedure or a handover procedure for end device 130. The redirection procedure or handover procedure may include generating and transmitting an RRC reconfiguration message, which may include the selected frequency/band associated with the requested network slice, to end device 130. Depending on the procedure, the target cell may or may not allocate any radio resources upfront before end device 130 may release a current radio connection. According to various exemplary embodiments, the RRC reconfiguration message may indicate to release a current radio connection or maintain (or not release) the current radio connection in view of a prospective CA or DC connectivity that may include a preferred frequency/band, as described herein.

FIG. 9 illustrates an exemplary embodiment of a process of frequency and network slice selection service, according to other exemplary embodiments, the frequency and network slice selection service may perform additional operations, fewer operations, and/or different operations than those illustrated and described.

Figure 10:
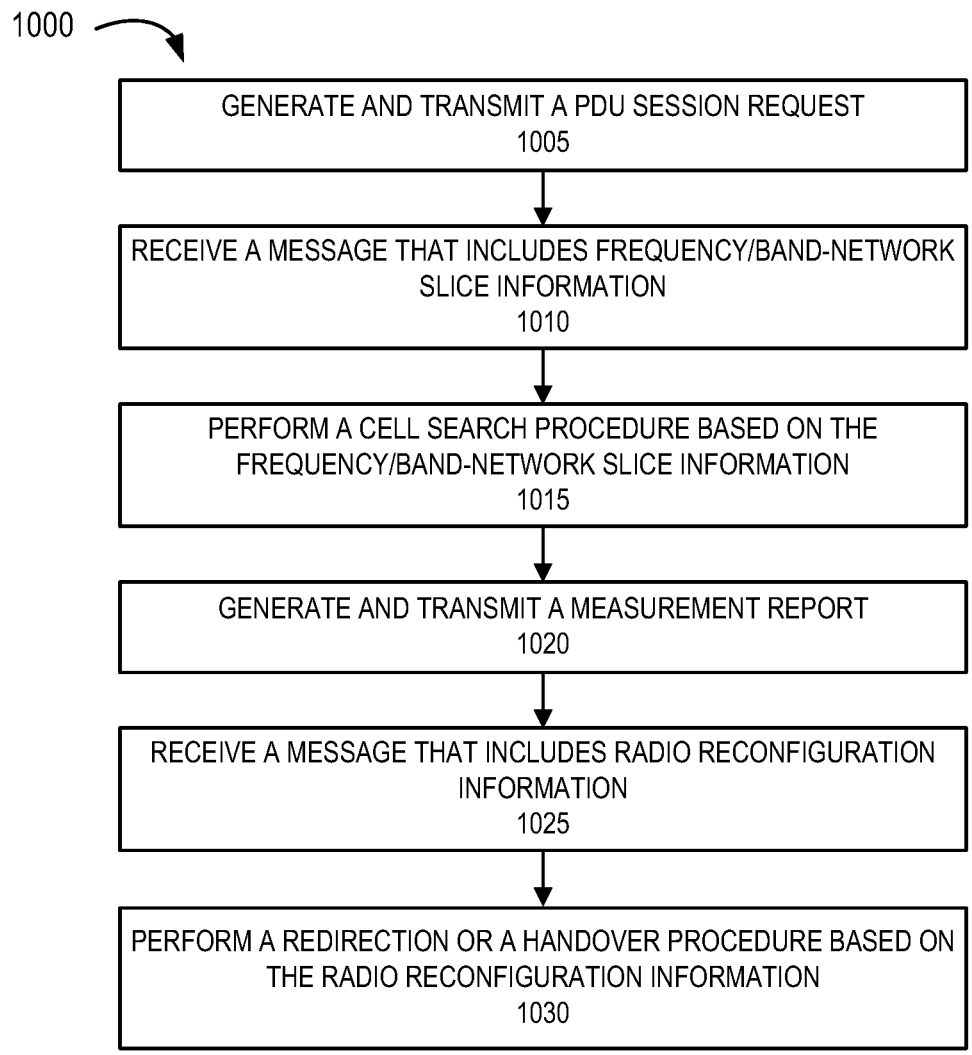
FIG. 10 is a flow diagram illustrating yet another exemplary process of an exemplary embodiment of a frequency and network slice selection service.

FIG. 10 is a flow diagram illustrating an exemplary process 1000 of an exemplary embodiment of frequency and network slice selection service. According to an exemplary embodiment, end device 130 may perform a step of process 1000. According to an exemplary implementation, processor 610 executes software 620 to perform the step of process 1000, as described herein. Alternatively, the step may be performed by execution of only hardware. Additionally, as described herein, an interface of end device 130 (e.g., modified, new) may support a communication of information for the frequency and network slice selection service.

In block 1005, end device 130 may generate and transmit a PDU session request to access device 107. The PDU session request may include network slice information and other information, as described herein. End device 130 may be in an RRC connected state. End device 130 may be registered with core network 120.

In block 1010, end device 130 may receive a message, which includes frequency/band-network slice information, from access device 107. For example, the message may be implemented as an RRC release message, as described herein.

In block 1015, end device 130 may perform a cell search procedure based on the frequency/band-network slice information. For example, end device 130 may search and measure one or multiple carriers and/or frequency bands indicated in the frequency/band-network slice information.

In block 1020, end device 130 may generate and transmit a measurement report, which includes a result of the cell search procedure, to access device 107.

In block 1025, end device 130 may receive, responsive to the measurement report, a message that includes radio reconfiguration information. For example, the message may be implemented as an RRC reconfiguration message, which includes a preferred frequency/band for the requested network slice.

In block 1030, end device 130 may perform a redirection or a handover procedure based on the radio reconfiguration information. For example, end device 130 may redirect or handover from a source cell to a target cell in accordance with the radio reconfiguration information.

FIG. 10 illustrates an exemplary embodiment of a process of frequency and network slice selection service, according to other exemplary embodiments, the frequency and network slice selection service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 7-10, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a network device from an end device, a request for a session;
    determining, by the network device in response to the request, that a current radio connection of the end device is not suitable for the session;
    generating, by the network device, a radio connection release message that indicates at least one network slice that is correlated to at least one of ranked radio frequencies or ranked radio bands, wherein the radio connection release message includes an indication to not release the current radio connection and to add another radio connection of the at least one of ranked radio frequencies or ranked radio bands; and
    transmitting, by the network device, the radio connection release message to the end device.

2. The method of claim 1, further comprising:
    receiving, by the network device from the end device, a measurement report that is responsive to the radio connection release message; and
    selecting, by the network device based on the measurement report, one of the at least one of ranked radio frequencies or ranked radio bands.

3. The method of claim 1, wherein the at least one of ranked radio frequencies is correlated to first preference values.

4. The method of claim 1, further comprising:
    storing, by the network device, a repository of frequency-network slice information pertaining to geographic areas of radio coverage; and
    performing, by the network device, a lookup in the repository based on the request.

5. The method of claim 1, wherein the request includes a network slice identifier.

6. The method of claim 1, further comprising:
    determining, by the network device, at least one of a tracking area code or a routing area code of the end device.

7. The method of claim 1, further comprising:
    analyzing, by the network device, the request.

8. The method of claim 1, wherein the network device includes a next generation Node B, a radio unit (RU), or a distributed unit (DU) and an RU.

9. A network device comprising:
    a communication interface; and
    a processor configured to:
        receive from an end device, a request for a session;
        determine, in response to the request, that a current radio connection of the end device is not suitable for the session;
        generate a radio connection release message that indicates at least one network slice that is correlated to at least one of ranked radio frequencies or ranked radio bands, wherein the radio connection release message includes an indication to not release the current radio connection and to add another radio connection of the at least one of ranked radio frequencies or ranked radio bands; and transmit the radio connection release message to the end device.

10. The network device of claim 9, wherein the processor is further configured to:

receive, from the end device, a measurement report that is responsive to the radio connection release message; and select, based on the measurement report, one of the at least one of ranked radio frequencies or ranked radio bands.

11. The network device of claim 9, wherein the at least one of ranked radio frequencies is correlated to first preference values.

12. The network device of claim 9, wherein the processor is further configured to:

store a repository of frequency-network slice information pertaining to geographic areas of radio coverage; and perform a lookup in the repository based on the request.

13. The network device of claim 9, wherein the request includes a network slice identifier.

14. The network device of claim 9, wherein the processor is further configured to:

determine at least one of a tracking area code or a routing area code of the end device.

15. The network device of claim 9, wherein the processor is further configured to:

analyze the request.

16. The network device of claim 9, wherein the network device includes a next generation Node B, a radio unit (RU), or a distributed unit (DU) and an RU.

17. A non-transitory computer-readable storage medium storing instructions executable by a processor of a network device that includes a communication interface, which when executed cause the processor to:

receive from an end device, a request for a session;

determine, in response to the request, that a current radio connection of the end device is not suitable for the session; and generate a radio connection release message that indicates at least one network slice that is correlated to at least one of ranked radio frequencies or ranked radio bands, wherein the radio connection release message includes an indication to not release the current radio connection and to add another radio connection of the at least one of ranked radio frequencies or ranked radio bands; and transmit the radio connection release message to the end device.

18. The non-transitory computer-readable storage medium of claim 17, wherein the instructions further comprise instructions, which when executed cause the processor to:

receive, from the end device, a measurement report that is responsive to the radio connection release message; and select, based on the measurement report, one of the at least one of ranked radio frequencies or ranked radio bands.

19. The non-transitory computer-readable storage medium of claim 17, wherein the request includes a network slice identifier.

20. The non-transitory computer-readable storage medium of claim 17, wherein the instructions further comprise instructions, which when executed cause the processor to:

determine at least one of a tracking area code or a routing area code of the end device.

* * * * *